United States Patent [19]
Sieckhaus et al.

[11] 3,899,456
[45] Aug. 12, 1975

[54] SILOXANE VULCANIZATES AND A METHOD FOR THE PREPARATION THEREOF

[75] Inventors: John F. Sieckhaus, Milford; Robert N. Scott, Wallingford; Trescott B. Larchar, Hamden, all of Conn.

[73] Assignee: Olin Corporation, New Haven, Conn.

[22] Filed: Feb. 19, 1974

[21] Appl. No.: 443,273

[52] U.S. Cl. ........ 260/18 S; 260/37 SB; 260/46.5 E; 260/46.5 R; 260/46.5 B; 260/45.75 R; 260/825
[51] Int. Cl.² .......................................... C08L 91/00
[58] Field of Search .......... 260/46.5 E, 46.5 G, 825, 260/46.5 R, 37 SB, 45.75 R, 18 S

[56] References Cited
UNITED STATES PATENTS

| | | | |
|---|---|---|---|
| 3,127,363 | 3/1964 | Nitzsche et al. | 260/46.5 G |
| 3,155,634 | 11/1964 | Pike | 260/46.5 R |
| 3,340,228 | 9/1967 | Wu | 260/46.5 R |
| 3,388,092 | 6/1968 | Heying et al. | 260/46.5 E |
| 3,457,222 | 7/1969 | Papetti | 260/46.5 E |
| 3,661,847 | 5/1972 | Chapman | 260/46.5 E |
| 3,689,455 | 9/1972 | Chapman | 260/46.5 E |
| 3,694,405 | 9/1972 | Litteral | 260/46.5 R |
| 3,696,090 | 10/1972 | Lampe | 260/46.5 G |
| 3,701,753 | 10/1972 | Shaw | 260/46.5 G |
| 3,705,120 | 12/1972 | Kawaguchi | 260/46.5 G |

*Primary Examiner*—Melvyn I. Marquis
*Attorney, Agent, or Firm*—Kenneth P. Glynn; Eugene Zagarella, Jr.

[57] ABSTRACT

Novel siloxane vulcanizates are prepared by the room temperature vulcanization of selected siloxane polymers which contain an electron donating substituent as a leaving group.

10 Claims, No Drawings

SILOXANE VULCANIZATES AND A METHOD FOR THE PREPARATION THEREOF

The invention herein described was made in the course of or under a contract or subcontract thereunder with the Department of the Navy.

This invention relates to novel siloxane vulcanizates and the preparation thereof by the room temperature vulcanization of selected siloxane polymers containing aromatic leaving groups in the presence of an acid catalyst.

Previously known conventional two component room temperature vulcanized silicone elastomer systems generally employ polydimethlsiloxane-$\alpha$, $\omega$ diols and esters of orthosilicic, polysilicic or alkyltrialkoxysilanes in conjunction with metal carboxylate catalysts. Low temperature vulcanizing systems have been based upon the reaction of polyorganosiloxanes containing alkenyl groups and those containing silicon-hydrogen bonds in the presence of platinum or platinum compounds.

Now in accordance with this invention novel siloxane vulcanizates are prepared by the room temperature vulcanization of the following siloxane polymers (I) using an acid catalyst:

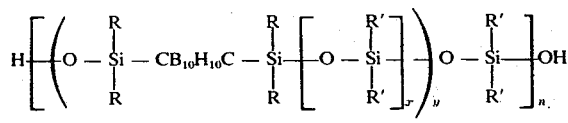

wherein each R is an independently selected alkyl group of one to 10, preferably one to four carbon atoms or an aryl group of six to 14, preferably six to 10 carbon atoms; each R' is an independently selected alkyl group of one to 10, preferably one to four carbon atoms or an aryl group of six to 14, preferably six to 10 carbon atoms or a phenyl group containing an electron donating substituent selected from the group consisting of o-, m- and p-alkyl of one to four carbons, dialkyl and trialkyl of one to four carbon atoms, p-amino, o- and p-alkoxy of one to four carbon atoms, o-, m- and p-trimethylsilylmethyl and p-phenyl with o-, m- and p-methyl, 2, 6 dimethyl, 2,4,6 trimethyl and o- and p-methoxy being particularly preferred; $x$ is 0 to 4, preferably 1 or 2; $y$ is 0 or 1; $n$ is a number of repeating units and may vary from about 1 to about 10,000, preferably from about 20 to about 1,000; and with the proviso that at least one R' is said substituted phenyl group. It is further noted that henceforth in the specification and claims, the radical —$CB_{10}H_{10}C$— is utilized to represent both of the wellknown m- and p-carborane cage structures as shown for example in U.S. Pat. No. 3,397,221 with the m-carborane structure being preferred.

The essential feature of this invention is the use of a phenyl group containing an electron donating substituent, which may be of the inductive or resonance type, as a leaving group. The starting siloxane polymers I, may be obtained in a variety of known ways such as the hydrolysis of bis (haloalkyl or haloaryl) silyl carborane as disclosed in U.S. Pat. No. 3,719,633 or by base catalyzed homopolymerization of cyclotrisiloxanes as disclosed in U.S. Pat. No. 3,385,821.

In carrying out the method of this invention an acid catalyst of the Lewis acid type is used. Such Lewis acids are defined by Jack Hine in the book "Physical Organic Chemistry," 1962, McGraw-Hill Book Co., New York and according to this definition, Bronsted acids are included by the term "Lewis acids." Suitable catalysts of this nature include p-toluene sulfonic acid, phenylphosphinic acid, sulfuric acid, acetic acid, dibutyltin dilaurate, stannous 2-ethylhexoate, ferric chloride, ferrous chloride, stannic chloride, stannous chloride, aluminum chloride, aluminum bromide, titanium tetrachloride, antimony pentachloride, hydrogen fluoride, triethyl aluminum, zinc chloride, zinc bromide, tetrabutyl titanate, cuprous chloride, gallium trichloride, boron trifluoride and its etherates such as $BF_3 \cdot Et_2O$ with stannous 2-ethylhexoate being preferred. Other catalysts of this type may be found in the Hine book referred to above and the book by George A. Olah entitled "Friedel-Crafts and Related Reactions" published by Interscience Publications, 1963-64.

The vulcanization procedure used in preparing the vulcanizates of this invention generally consists of mixing the components, such as on a rubber mill, followed by curing through concurrent elimination of an aromatic leaving group and formation of an Si—O—Si crosslink using Lewis acids as the catalyst or curing agent. The procedure may be carried out over temperatures which vary from about 0° to about 250°C however, it is preferred to use temperatures of from about 15° to about 30°C and more preferably ambient or room temperature. The curing may take place under pressure such as using a press mold but such use of pressure is not necessary.

In preparing vulcanizates in accordance with this invention, various additives such as fillers e.g. silica, silicate, etc.; antioxidants e.g. iron oxide, iron powder, carbon black, etc.; pigments and crosslinking agents may be incorporated to give varying desired properties to the resulting vulcanizate. Useful crosslinking agents include (1) polyhydroxy phenols e.g. resorcinol and phloroglucinol, (2) disilanols e.g. diphenylsilane diol, (3) $\alpha$, $\omega$ dihydroxy polydialkylsiloxanes where the alkyl group may be a linear alkyl group of one to three carbon atoms or an aromatic group of six to 10 carbon atoms and the number of siloxane units in the oligomer chain may vary from one to 10 with two to four being preferred, (4) dihydroxy o- and m-carboranes as disclosed in pending application Ser. No. 366,346 filed June 4, 1973 by T. A. Knowles and R. N. Scott and entitled "Dihydroxy Carboranes and the Method of Preparation," and now U.S. Pat. No. 3,862,237, (5) aliphatic glycols containing two to 10 and preferably two to four carbon atoms, (6) dihydroxy terminated glycol ethers consisting of all ethylene glycol units, all propylene glycol units or a random mixture of the two where the number of repeating units in the polyether chain may vary from two to 20 with three to 10 being preferred. The incorporation of crosslinking agents is particularly desirable when using high molecular weight polymers (I), i.e., above about 50,000. The particular amount of additive used may vary widely but generally from about 0 to about 200 parts by weight of filler per 100 parts by weight of polymer and preferably about 50 to about 120 parts are used. From about 0.1 to about 30 and preferably about 4 to about 10 parts by weight of antioxidant per 100 parts of polymer may be used and the amount of crosslink agent may vary from about 0 to about 50 mole % of the replaceable aromatic leaving groups in the polymer I.

Generally a catalytic amount of the Lewis acid is used in the vulcanization procedure but more particularly amounts of from about 1 to about 15 parts by weight preferably about 3 to about 7 parts by weight per 100 parts by weight of polymer may be used.

The vulcanizates of this invention are thermally stable, elastomeric and have good adhesion to substrates. These and other desirable properties possessed by the prepared vulcanizates make them useful in a variety of applications such as molded rubber parts e.g. gaskets, o-rings and seals, various electrical insulation, diaphragms, etc.

This invention is further illustrated by the following examples.

EXAMPLE I

The following components were mixed on a rubber mill:

|  | Parts by wt |
|---|---|
| Polymer A | 100 |
| Translink 37 (silane treated Kaolin clay) | 96 |
| Cab-O-Sil MS-7 (colloidol pyrogenic silica pigment) | 19 |
| Fe₂O₃ | 6 |
| Stannous 2-ethylhexoate | 6 |

Polymer A is a 40,000 MW material of the formula:

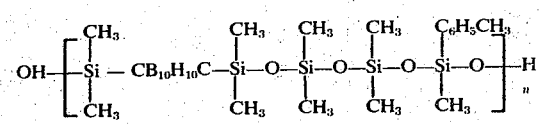

The mixture was press molded in a 2 inch × 2 inch × ⅛ inch mold for 15 minutes at ambient temperature. After three days of aging at ambient temperature, the resulting elastomer was found to have the following physical properties:

| Tensile Strength (psi) | 150 |
|---|---|
| Elongation (%) | 48 |
| Hardness (Shore A) | 83 |

EXAMPLE II

The following components were mixed and press molded as in Example I:

|  | Parts by wt |
|---|---|
| Polymer A | 100 |
| Carbon black | 20 |
| Translink 37 | 80 |
| Iron powder | 1 |
| Stannous 2-ethylhexoate | 6 |

After 3 days of aging at ambient temperature, the resulting elastomer was found to have the following physical properties:

| Tensile Strength (psi) | 268 |
|---|---|
| Elongation (%) | 68 |
| Hardness (Shore A) | 73 |

EXAMPLE III

The following components were mixed and press molded as in Example I:

|  | Parts by wt |
|---|---|
| Polymer A | 100 |
| Carbon black | 20 |
| Translink 37 | 80 |
| Cab-O-Sil MS-7 | 15 |
| Iron Powder | 1 |
| Stannous 2-ethylhexoate | 6 |

After 3 days of aging at ambient temperature, the resulting elastomer was found to have the following physical properties:

| Tensile Strength (psi) | 235 |
|---|---|
| Elongation (%) | 60 |
| Hardness (Shore A) | 77 |

What is claimed is:

1. A method for preparing siloxane vulcanizates comprising adding a polymer of the following formula:

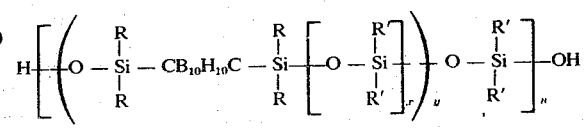

wherein each R is independently selected from the group consisting of an alkyl group of one to 10 carbon atoms and an aryl group of six to 14 carbon atoms; each R' is independently selected from the group consisting of an alkyl group of one to 10 carbon atoms, an aryl group of six to 14 carbon atoms and a phenyl group containing an electron donating substituent selected from the group consisting of o-, m- and p-alkyl of one to four carbons, dialkyl and trialkyl of one to four carbon atoms, p-amino, o- and p-alkoxy of one to four carbon atoms, o-, m- and p-trimethylsilylmethyl and p-phenyl; $x$ is 0 to 4; $y$ is 1; $n$ is about 20 to about 10,000 with the proviso that at least one R' is said substituted phenyl group to a Lewis acid catalyst and then curing said mixture at a temperature of from about 15 to about 30°C.

2. The method of claim 1 wherein said alkyl R and R' groups are one to four carbon atoms, said aryl R and R' groups are six to 10 carbon atoms and $x$ is 1 or 2.

3. The method of claim 1 wherein $n$ is about 20 to about 1,000.

4. The method of claim 3 wherein said electron donating substituent is selected from the group consisting of o-, m- and p-methyl, 2,6 dimethyl, 2,4,6 trimethyl and o- and p-methoxy.

5. The method of claim 4 wherein from about 0 to about 200 parts by weight of a filler per 100 parts by weight of polymer, from about 0.1 to about 30 parts by weight of an antioxdant per 100 parts by weight of polymer and a crosslinking agent in amounts of from about 0 to about 50 mole % of the replaceable electron donating substituent groups in the polymer, are added to the mixture.

6. The method of claim 5 wherein said crosslinking agent is selected from the group consisting of polyhydroxyphenols, disilanols, α, ω dihydroxypolydialkylsiloxanes, dihydroxy o- and m-carboranes, aliphatic glycols containing two to 10 carbon atoms and dihydroxy terminated glycol ethers.

7. The method of claim 5 wherein all R and R' groups are methyl except one R' group which is tolyl.

8. The method of claim 7 wherein $x$ is 2.

9. The method of claim 8 wherein said Lewis acid catalyst is stannous 2-ethylhexoate.

10. The siloxane vulcanizate prepared by the method of claim 3.

* * * * *